United States Patent [19]

Fleenor et al.

[11] Patent Number: 4,930,344
[45] Date of Patent: Jun. 5, 1990

[54] INSTRUMENT FOR MEASURING PACKAGE SEALS

[75] Inventors: J. Jerome Fleenor, Midlothian; Christopher N. Chance, Richmond; Robert T. Mitten, Glen Allen, all of Va.

[73] Assignee: Philip Morris Incorporated, New York, N.Y.

[21] Appl. No.: 331,598

[22] Filed: Mar. 30, 1989

[51] Int. Cl.⁵ .............................................. G01M 3/32
[52] U.S. Cl. ........................................ 73/49.3; 73/52
[58] Field of Search .................. 73/49.3, 52, 45.4; 53/53

[56] References Cited

U.S. PATENT DOCUMENTS

| | | | |
|---|---|---|---|
| 3,251,218 | 5/1966 | Russell | 73/52 |
| 4,012,945 | 3/1977 | Bergstrand | 73/49.2 |
| 4,118,972 | 10/1978 | Goeppner et al. | 73/40 |
| 4,205,551 | 6/1980 | Clifford et al. | 73/52 |
| 4,517,827 | 5/1985 | Tapscott | 73/45.4 |
| 4,539,836 | 9/1985 | Hester et al. | 73/49.3 |
| 4,593,554 | 6/1986 | Aarts | 73/49.3 |

FOREIGN PATENT DOCUMENTS

| | | | |
|---|---|---|---|
| 105033 | 6/1983 | Japan | 73/49.3 |
| 7810210 | 4/1980 | Netherlands | 73/52 |

Primary Examiner—Jerry W. Myracle
Assistant Examiner—Joseph W. Roskos
Attorney, Agent, or Firm—John R. Storella; Mark D. Rowland

[57] ABSTRACT

An apparatus for testing the quality of a seal on a package overwrap having a cutting or burning element to create a hole in the package overwrap without breaching the integrity of the package; a measuring head for introducing super-atmospheric air pressure through the hole between the overwrap and the package; and a pressure transducer for determining whether the rate of air leakage from the overwrap is within acceptable limits.

20 Claims, 6 Drawing Sheets

INSTRUMENT FOR MEASURING PACKAGE SEALS

TECHNICAL FIELD OF THE INVENTION

The field of this invention is the measurement of the quality of package seals. It relates to an apparatus which can determine the leakage flow rate from a package overwrap without breaching the integrity of the package itself, and methods for the same. More particularly, this invention relates to an easy-to-use, portable instrument which tests for air leakage through a sealed polymer overwrap, such as that on a cigarette package, by creating a hole in the sealed wrap, e.g., by burning, and measuring the pressure required to force a regulated flow of air through the hole. It also relates to improved measuring heads used in such devices.

BACKGROUND OF THE INVENTION

For perishable packaged products, exposure to the air outside the package can adversely effect the quality or shelf life of the product. For example, cigarettes exposed to the air lose moisture and can taste stale or harsh within a short time.

For this reason, the packages of perishable goods like cigarettes are typically wrapped in an air-tight overwrap. The overwrap prevents moisture loss and maintains product freshness. A material commonly used for this purpose is polyethylene film, which is wrapped around the package and sealed by heating and pressing together overlapping portions of the wrap.

Because seal quality is important to product quality, its measurement is an important part of quality control in the food and tobacco industries. The quality of an overwrap seal is a function of its resistance to air leakage. Therefore, means and methods for easily and accurately testing air leakage from overwraps are important to these industries.

The most popular means of testing air leakage involves introducing pressurized air into the package and measuring in some way the pressure that builds up inside. In one method, the operator punctures the overwrap and package with a needle through which air flows into the inside of the package. This procedure has several problems. The most important problem is that the needle breaches the integrity of the package. As a result, the package now has a visible hole. This causes the contents inside the tested package to be exposed directly to the air outside, precisely the situation packages are designed to avoid.

A more troubling problem with this method has to do with consumer confidence: a punctured package appears to have been tampered with. Due to recent and well-publicized incidents of product tampering in various industries, consumers have become particularly sensitive to the integrity of packaged goods. Manufacturers who test package seals by the puncture method risk causing consumer alarm if such a tested package was ever accidentally shipped to a retailer and examined by a consumer.

Devices which introduce pressure through a needle also have problems accurately introducing or measuring pressure. The air pressure introduced can vary depending upon whether the needle enters an air space in the package or the packaged material. In the case of a cigarette pack, for example, this method would give different results if the needle entered either an air space or a cigarette rod. Furthermore, pressure could leak out from around the punctured hole.

These devices suffer from other problems as well. Some are too slow or too complex to be useful on the manufacturing floor for providing real time information on seal quality of randomly selected packages. Yet other methods require sources of special gases, fluids, or highly pressurized air.

A more sophisticated device is the package leak tester of Hester et al., U.S. Pat. No. 4,539,836 ("Hester"). Hester's device requires the operator to puncture a hole through the overwrap into the package, thus breaching package integrity. However, the Hester device introduces air pressure to the package by means of a test head. The test head contains a concentric vacuum area which surrounds a central area through which pressure is delivered. The vacuum area holds the package in place and the central area delivers pressure to the hole in package. If the overwrap seal is tight, the pressure to the package will be greater than the vacuum holding the package to the test head, and the package will be ejected.

This device also has several problems in addition to some of the ones associated with the puncture method. First, there are problems of accuracy. The vacuum between the overwrap and test head is maintained by rubber O-rings. O-rings have a danger of leaking. One result of this is decreased vacuum to the package and a consequent indication that the overwrap is tighter than it actually is. Another problem is that air pressure meant to be delivered into the overwrap might instead get sucked into the vacuum area. This would indicate a weak seal since there would not be enough pressure to eject the package. Yet another problem is that Hester's device introduces air to the inside of the package through the hole created by puncture, not just under the overwrap. This may affect the accuracy of measurement. It will surely extend the time necessary for measurement since the pressure will have to equilibrate inside the package as well as between the package and overwrap. This could make the measurement of large packages troublesome since a lot of air would be needed to completely pressurize them.

Second, Hester's device does not quantitatively measure the seal quality: either the test head holds the package, or the package is ejected.

Third, the device is practical only for small packages. It relies on suction to hold the weight of the package and pressure to eject it from the test head. It would be difficult to generate the enormous vacuums and pressures necessary to hold and eject heavy packages, and such pressures could rip the overwrap.

Finally, the device is awkward. It requires an outside source of air pressure and so is not self-contained.

Therefore, there is a need in the art to provide for an instrument to measure package seals which does not breach the integrity of the package, which can accurately and quantitatively measure pressure, which avoids air leaks around the measuring head and into the package, which can accommodate packages of many sizes, and which is portable and which can be used quickly and easily at various locations on the manufacturing floor (e.g., at an inspection station in the production area).

SUMMARY OF THE INVENTION

In view of the foregoing, it is an object of the present invention to provide an easy-to-use method and apparatus for quickly and objectively measuring the quality of a sealed overwrap layer.

This invention provides means and methods for introducing air pressure between the overwrap and the package without breaching the integrity of the package. The invention achieves this by creating a hole in the overwrap but not in the package. In particular, this invention provides for the use of a heating element to burn a hole through the overwrap film of a package at a predetermined location on the package without puncturing or otherwise breaching the package itself. However, it should be noted that one could introduce the hole by other means, such as cutting. The important thing is to create a hole in the overwrap without breaching the integrity of the package.

This invention also provides for a measuring head which, through a testing face, adheres to the overwrap with suction and introduces air pressure between the overwrap and the package. The operator positions the package against the measuring head such that the hole in the overwrap is directly over the part of the measuring head which delivers the air pressure. The suction is maintained by the metal of the measuring head itself, thereby avoiding the problem of air leaks through rubber O-rings.

This invention also provides for a transducer which quantitatively measures the air pressure required to maintain the flow of air into the package. This provides a signal proportional to the pressure level which is used to generate a digital display and indicates the quality of the overwrap seal. Because the measuring head of this invention is detachable and is not required to hold the weight of the package, this invention is useful for packages of many sizes.

This invention also provides for an internal air supply and vacuum system, making it self-contained and portable.

BRIEF DESCRIPTION OF THE DRAWINGS

The above and other objects and advantages of the present invention will be apparent upon consideration of the following detailed description, taken in conjunction with the accompanying drawings, in which like characters refer to like parts throughout, and in which.

DETAILED DESCRIPTION OF A PREFERRED EMBODIMENT

Figure 1A:
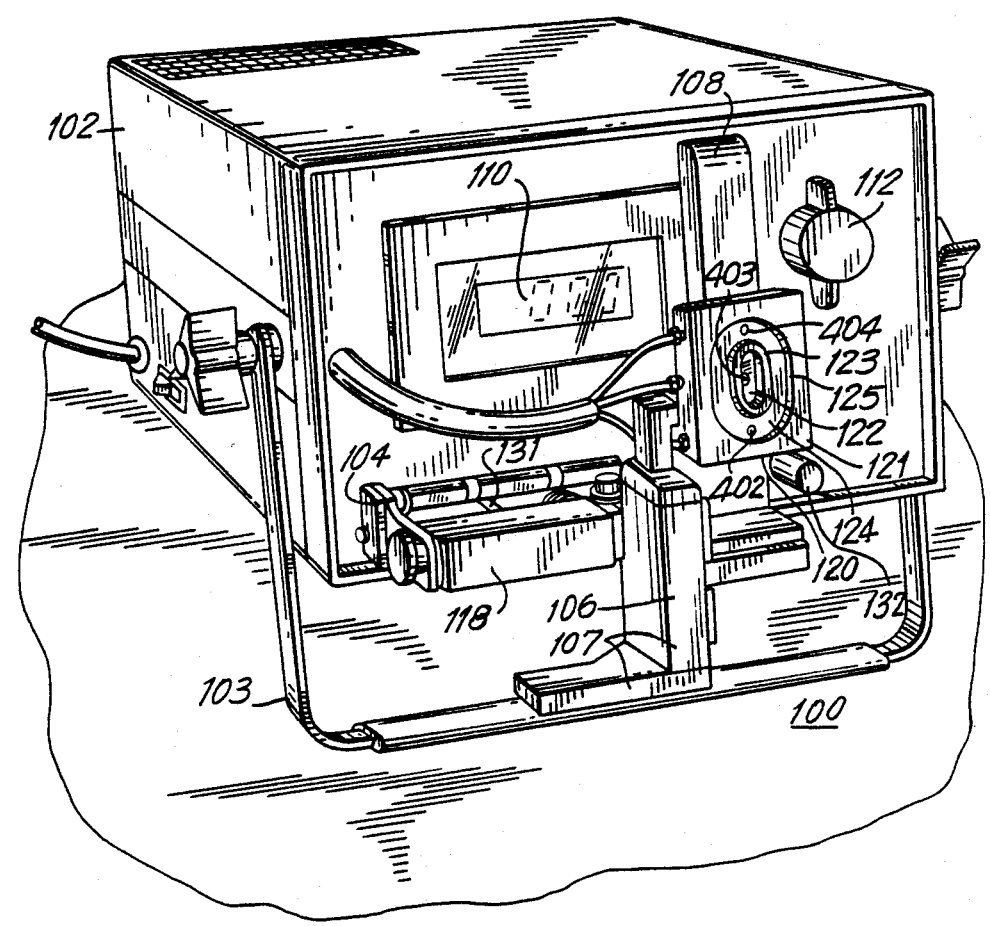
FIG. 1(A) is a perspective view of an exemplary embodiment of the measuring apparatus of the present invention, including a heating element and measuring head.
Figure 1B:
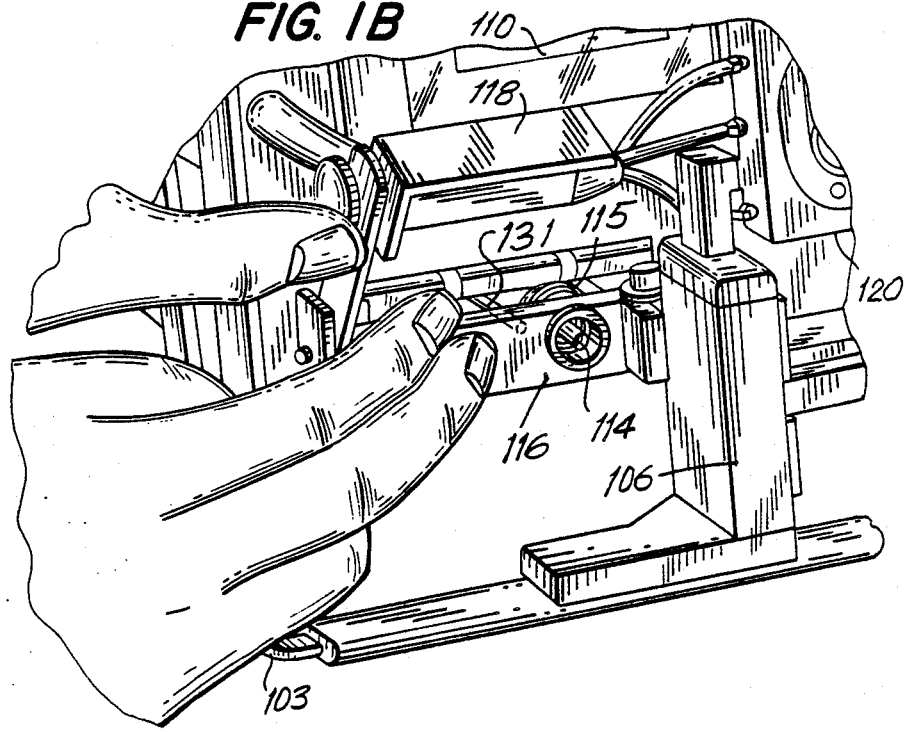
FIG. 1(B) is a perspective view of the exemplary embodiment of FIG. 1(A) with the heating element of the apparatus exposed.

FIGS. 1(A)–1(D) show a preferred embodiment of an apparatus 100 operable in accordance with the principles of the present invention. The apparatus of FIGS. 1(A)–1(D) is designed to measure the seal quality of the polyethylene overwrapped packages. It is fully portable, self-contained and can be powered using a standard 115 VAC, 50/60 Hz power supply. Apparatus 100 provides fast and accurate data, and one can use it safely and reliably even in dust-laden manufacturing environments. It is to be understood that although we illustrate herein the method and apparatus of the present invention to measure seals on cigarette packs by apparatus 100, one can apply them in various industries other than the cigarette industry to measure the quality of seals on packages other than cigarette packs, including for example overwrap films applied to carton packages.

Apparatus 100 includes a case 102, supported on an adjustable handle 103, having attached to the front thereof a heater assembly 104, a support bracket assembly 106, a measuring head assembly 108, a digital display panel 110 and a zero control knob 112. The rear of the case (not shown) contains an AC power cord, an on-off switch connected in a conventional manner to control the application of power to apparatus 100, a BCD output for providing the data displayed on panel 110 in binary coded decimal format to a computer, and circuit breakers conventionally connected to protect the electrical components of apparatus 100 from overload.

Heater assembly 104 includes a heat iron having a flat-faced heater tip 114 mounted in case 102, and a hinged safety cover 118. The safety cover protects the user from accidentally coming into contact with the heater tip. Safety cover 118 is shown in its closed position in FIGS. 1(a) and 1(d), and in its open position in FIGS. 1(b) and 1(c).

The heat iron and heater tip are commercially available, such as the Model GEC120 heat iron and Model G106 tip, from Waller Inc. of Sheraw, S.C. Particularly important in this model is the solid-state circuitry which includes an adjustable temperature control for setting the optimum temperature for creating the proper hole by the heater tip. The solid-state model provides an accurately maintained temperature with a very fast recovery time in order to consecutively test a large number of packages. The heat iron is connected in apparatus 100 to a source of AC current which causes the heater tip to reach the set temperature when apparatus 100 is turned on. A timer is incorporated in apparatus 100 to turn off the heater and the other components of apparatus 100 automatically when the apparatus is not in use for a period of approximately five minutes. A detector switch 131 determines when the burning apparatus is in use by detecting the retraction of guard block 116 and preventing the time-out function from occurring. Similarly, detector switch 132 determines when the measuring apparatus is in use by detecting the placement of a pack on measuring head 120 and also prevents the time-out from occurring. Therefore, an extended life of apparatus 100 is possible with this function.

Figure 1C:
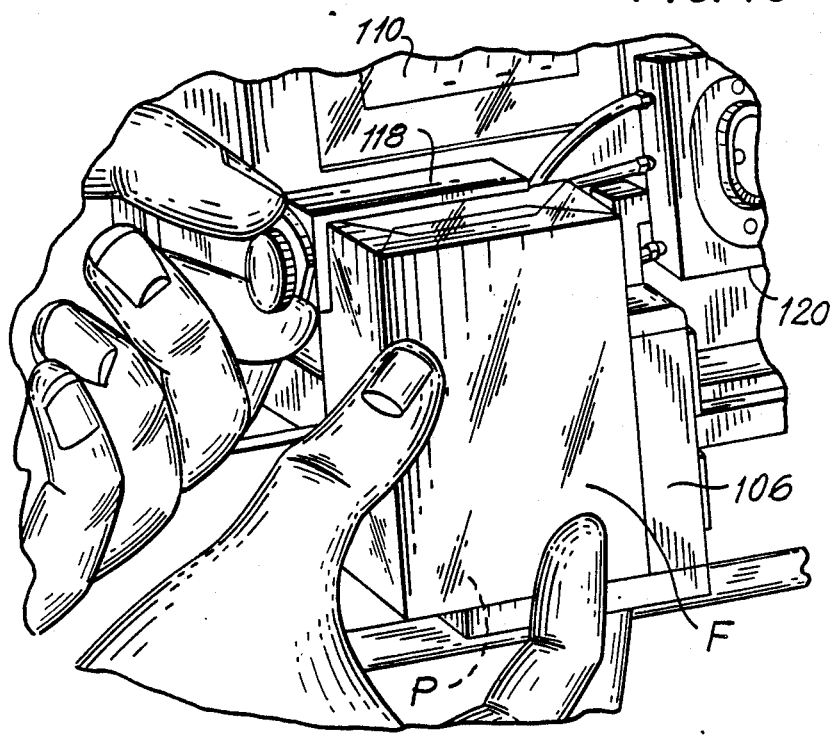
FIG. 1(C) is a perspective view of the exemplary embodiment of FIG. 1(A) with a cigarette pack positioned in front of the exposed heating element of the apparatus.

Heater tip 114 is housed in a reciprocating guard block 116 which is biased by reciprocating means 115 to extend forward of the face of heater tip 114. The front surface of guard block 116 is parallel to that of heater tip 114, such that when a cigarette pack is placed against the front surface of guard block 116 and pressure is applied in the direction of heater tip 114 (as shown in FIG. 1(C)), the guard block retracts against its spring to bring the package into even contact with the flat face of heater tip 114. The tip burns a small hole through the overwrap of the cigarette pack. Once the cigarette pack has been brought into contact with the heater tip and the hole created, the user quickly releases his or her hand from the pack to permit the guard block to push the pack away from the heater tip.

Support bracket assembly 106 includes perpendicular X-Y bracket arms 107 extending below and to one side of guard block 116 which are used to support and position the cigarette pack against guard block 116. The arms are designed to correctly position the pack with respect to heater tip 114. One of ordinary skill in the art could easily design arms to position packages of other sizes.

Figure 1D:
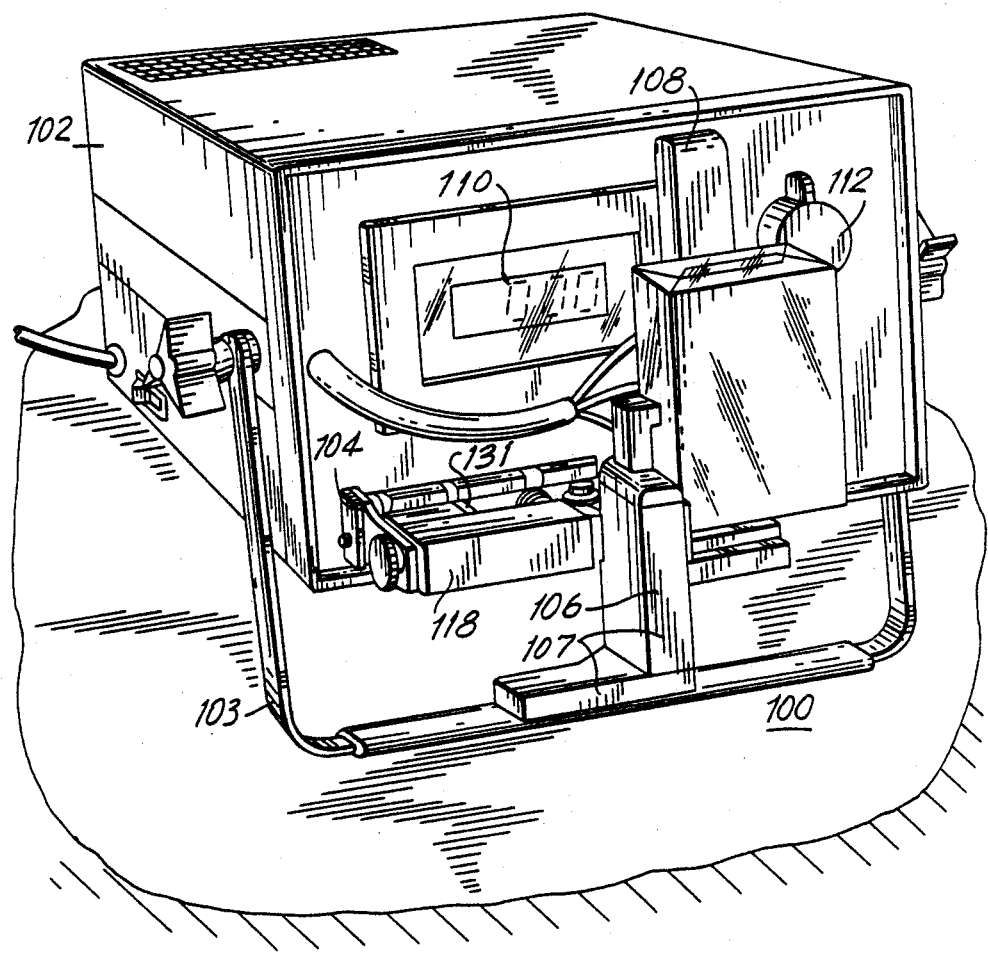
FIG. 1(D) is a perspective view of the exemplary embodiment of 1(A) with a cigarette pack adhering to the measuring head of the apparatus.
Figures 4, 4A:
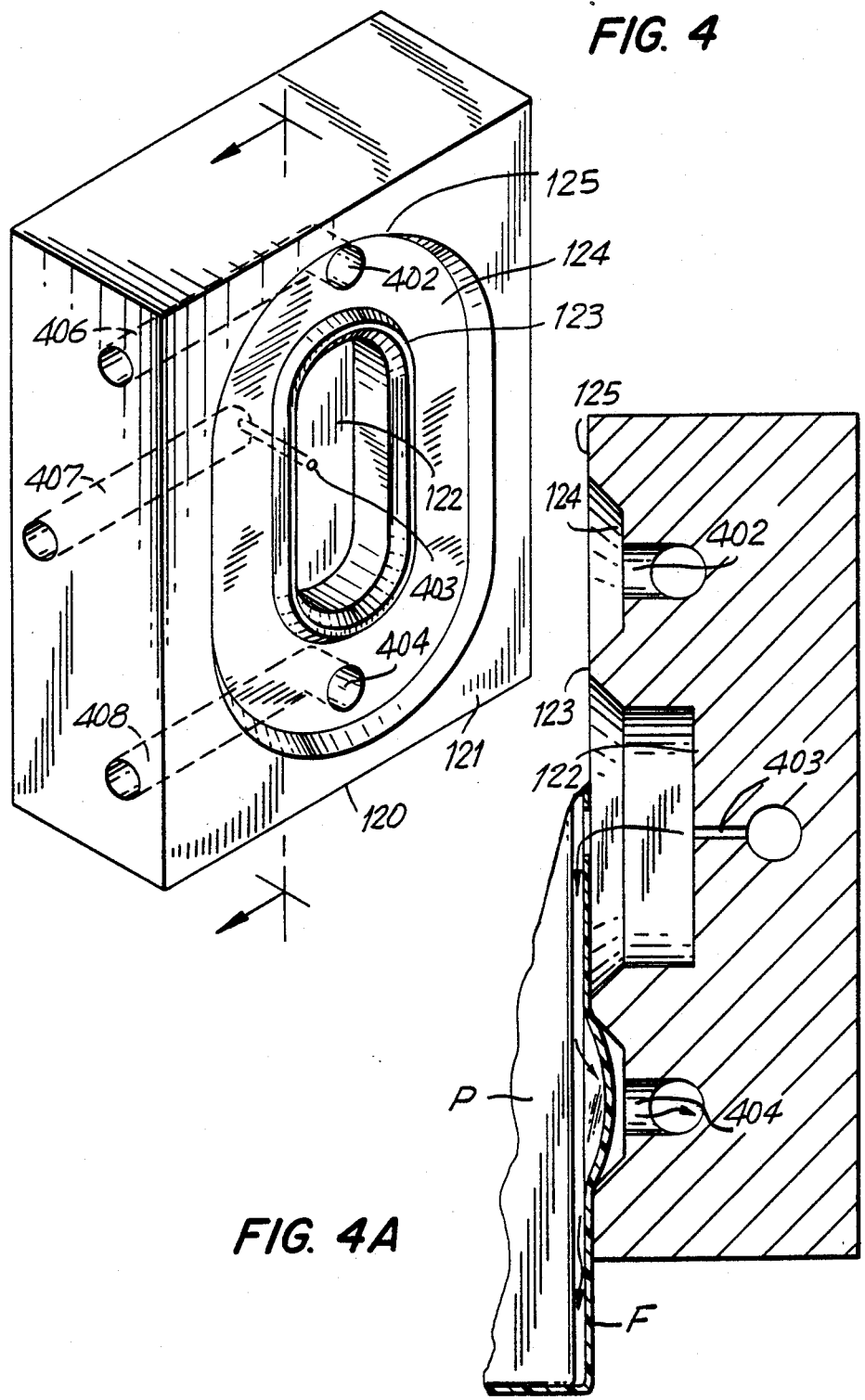
FIG. 4 is a perspective view of the measuring head.
FIG. 4A is a cross-sectional view of the measuring head of the embodiment of FIGS. 1(A)–1(D) taken along the line 4A—4A of FIG. 4. It also shows an attached package.

After a hole is burned through the overwrap of a cigarette pack, one places the pack against the face of measuring head assembly 108, as shown in FIG. 1(D). Measuring head 120 is made of metal, e.g., aluminum with a hardened anodized coating. The front testing face 121 of measuring head 120 is flat and contains two concentric cavities: outer cavity 124 and inner cavity 122. The cavities are defined by outerlip 125 and inner lip 123. The inner lip should be raised to about the level of the face of the measuring head. Outer cavity 124 has two apertures, 402 and 404 which communicate via channels 406 and 408 to the outside of the measuring head as shown in FIG. 4. Similarly, inner cavity 122 contains aperture 403 which communicates via channel 407 to the outside of the measuring head.

To test the seal on a wrapped package, the operator should position the package against testing face 121 of measuring head 120 so that the hole in the overwrap is directly over and within the boundaries of inner cavity 122 and the overwrap completely covers outer cavity 124. Support bracket assembly 106 includes a second pair of support arms 126 for supporting and positioning the pack in front of measuring head 120. It should be noted that one can detach measuring head 120 from measuring head assembly 108 and move it to conveniently test a package of awkward size.

When the cigarette pack is thus positioned against testing face 121 of measuring head 120, a partial vacuum is created in outer cavity 124 by suction means of apparatus 100 which causes a seal to be created between the overwrap and measuring head 120 around the hole in the overwrap. Because this seal is created at inner and outer lips 123 and 125 by direct contact between the polyfilm overwrap and metal surface of the measuring head, it is particularly secure against leakage, especially from air from inner cavity 122. By contrast, when O-rings define these borders, there is danger of air leaking around the O-rings. FIG. 4A illustrates the adhesion of package P to the measuring head by the suction on overwrap film F.

Air pressure is then introduced into inner cavity 122 by air pressure means of apparatus 100, causing a flow of air through the hole and between the overwrap and the package. Because there is no hole in the package, itself, air does not directly pressurize the package interior. The flow of air inflates the cigarette pack overwrap. Because the overwrap resists air flow outward, a back pressure is created in inner cavity 122 of measuring head 120. This back pressure is directly related to the integrity of the overwrap seal, and is sensed by pressure transducer 200 in apparatus 100.

Pressure transducer 200 is a conventional device which produces an electrical signal responsive to the sensed pressure, and conventional circuitry can be used to convert the signal into a digital display reading proportional to the sensed pressure. An example of such circuitry is illustrated by the schematic of FIG. 2.

Figure 2:
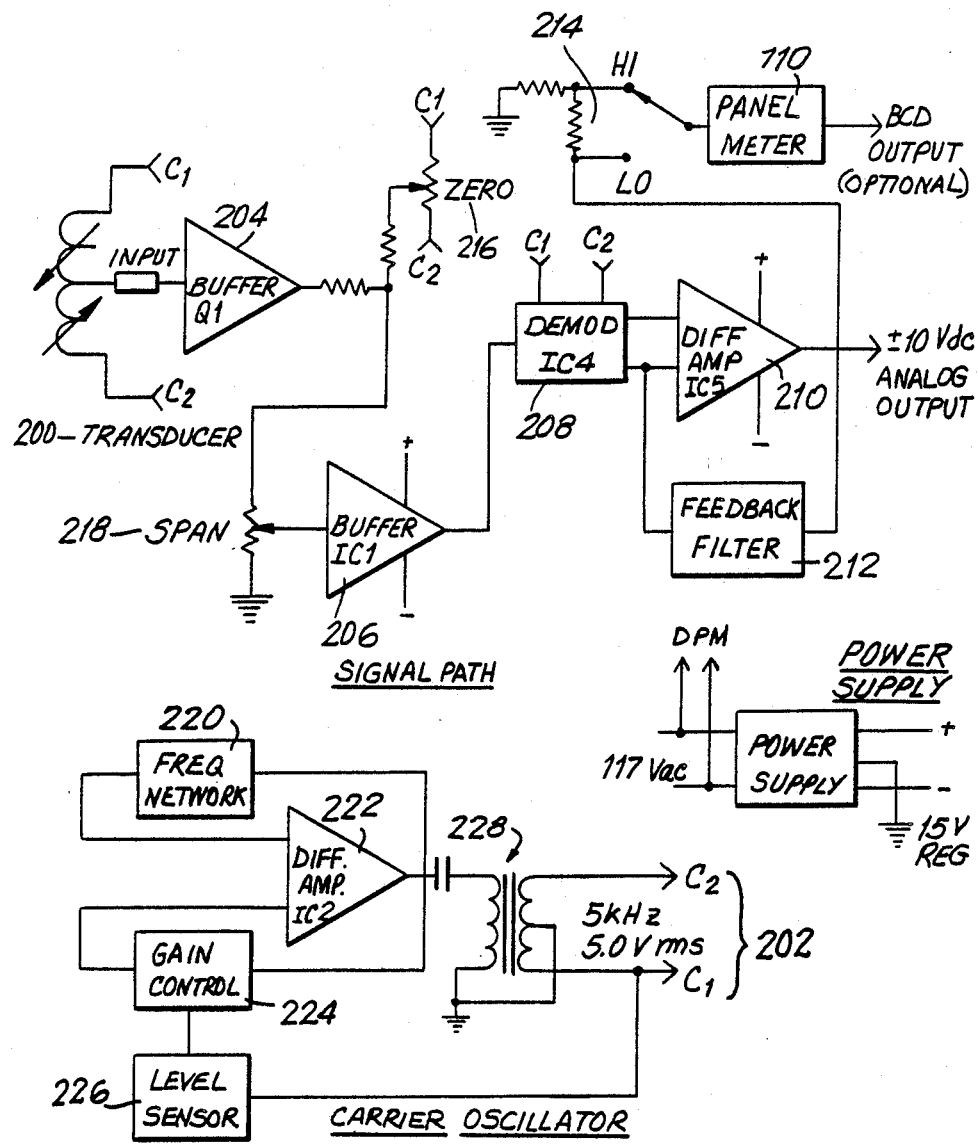
FIG. 2 is a functional block diagram of the transducer demodulation and digital display circuit of the embodiment of FIGS. 1(A)–1(D).

Referring to FIG. 2, a fixed frequency sine wave is generated in frequency network 220 and amplified through differential amplifier 222. Level sensor 226 and gain control 224 regulate the frequency. The sine wave is converted to a 5.0 rms, 5 kHz signal by transformer 228 and provided via terminals $C_1$ and $C_2$ to transducer 200. The transducer modulates the sine wave in accordance with variations in the sensed pressure, and the modulated signal is provided through buffers 204 and 206 to a demodulator circuit 208. The demodulator circuit filters the modulated signal and produces a differential output signal which is converted by differential amplifier 210 and feedback filter 212 into an analog voltage signal proportional to the pressure sensed by the transducer. The analog voltage signal, in turn, is provided through an attenuator network 214 to the digital display panel 110 on the front of apparatus 100.

Attenuator network 214 has two output terminals HI and LO. The analog voltage signal generated by differential amplifier 210 and feedback filter 212 appears at terminal LO, and an analog voltage signal having an attenuated voltage level appears at terminal HI. A range switch 214 is provided to connect either terminal HI or LO to the input for display panel 110 depending on the desired range of display panel 110. A potentiometer 216 adjusted by zero control knob 112 is used to calibrate apparatus 100 to create a zero display when there is no back pressure created in inner cavity 120. A second potentiometer 218 is used to control the span display, and should be used only to log and reset calibration for a given transducer and range.

The transducer and the above-described associated circuitry can be implemented using commercially available parts. For example, transducer 200 can be implemented using a Model DP15-30 transducer commercially available from Validyne Engineering Corp. of Northridge, Calif., and the demodulator and digital display circuitry can be implemented using a single assembly, known as the Model CD-23 transducer indicator assembly, also available from Validyne Engineering Corp.

Figure 3:
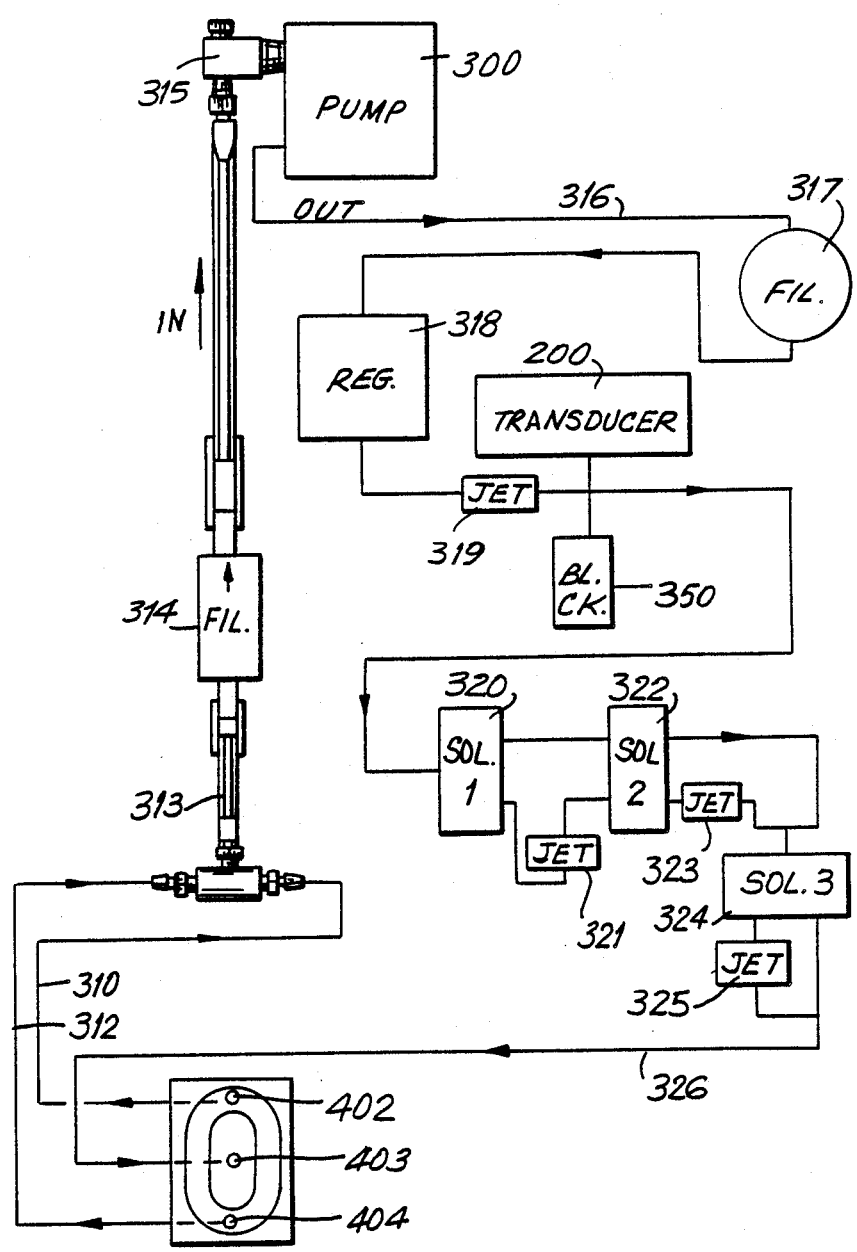
FIG. 3 is a schematic illustration of the air flow through the embodiment of FIGS. 1(A)–1(D)

Apparatus 100 includes a self-contained air supply and vacuum system connected to the inner and outer cavities of measuring head 120 for respectively pressurizing inner cavity 122 and evacuating outer cavity 124 when a cigarette pack is positioned against testing face 121. This system is described below with reference to the air flow diagram of FIG. 3 and the cross-sectional view of measuring head 120 of FIG. 4 (the view of FIG. 4A is taken along sectional line 4A—4A of FIG. 4).

Pump 300 provides the air flow to and from measuring head 120. When apparatus 100 is turned on, pump 300 is powered. The pump is a rotary vane oil-less type. The pump causes air to be drawn from outer cavity 124 via openings 402 and 404 in the bottom of the cavity. Openings 402 and 404 lead respectively to channels 406 and 408 which conduct air out of measuring head 120 to a pair of air tubes, 310 and 312, respectively. The tubes join into common tube 313. The air passes through filter 314 and into the pump intake 315. Pump 300 pumps air out to line 316, through filter 317, and through regulator 318 (Bellofram Type 10-LR regular). Jet 319 restricts the pressure at this point to about 3 psi. Transducer 200 measures the pressure in the line at this point. Block check 320 allows pressure to escape to the air if it becomes too great, and protects the apparatus from damage when, for example, aperture 403 is blocked. Solenoids 320, 322, and 324 are coupled with jets 321, 323, and 325 and allow the operator to calibrate the machine. After calibration, and for use, air is directed into line 326, into channel 407, into measuring head 120, through aperture 403, and into inner cavity 122. This creates the air flow into the hole in the overwrap. When the overwrap is inflated it produces a back pressure whose measurement we have previously described.

The measure of back pressure is the measure of seal quality. If, upon pressurization, a wrapped package achieves a certain, predetermined back pressure, this indicates that the seal is acceptably tight. If it does not, then the wrapped package leaks too much air and is not sealed properly.

The device described above is given as one possible embodiment of the invention. It should be apparent that one of ordinary skill in the art could make changes in the described device while remaining within the invention.

What is claimed is:

1. An apparatus for testing the quality of a seal on a package overwrap comprising:
   (a) means for creating a hole in the overwrap without breaching the integrity of the package;
   (b) air pressure means for introducing super-atmospheric air pressure between the overwrap and the package through the hole; and
   (c) means for determining whether the rate of air leakage from the overwrap is within acceptable limits.

2. The apparatus of claim 1 wherein said means for creating a hole are burning means.

3. The apparatus of claim 1 further comprising suction means for applying suction to the overwrap.

4. The apparatus of claim 3 further comprising a measuring head, said measuring head having means for applying said suction to the overwrap and said air pressure between the overwrap and the package.

5. The apparatus of claim 4 wherein the measuring head comprises a body having a substantially flat testing face, said testing face having outer and inner cavities arranged concentrically and defined by inner and outer lips, said outer cavity having a first aperture or apertures communicating with said suction means and said inner cavity having a second aperture communicating with said air pressure means.

6. The apparatus of claim 5 wherein the areas of the testing face contacting the overwrap including the inner and outer lips are metalized.

7. The apparatus of claim 5 wherein the measuring head is detachable.

8. The apparatus of claim 5 wherein the means for determining the acceptablity of the rate of air leakage is a transducer which measures back pressure.

9. A method for testing the quality of a seal on a package overwrap comprising the steps of:
   (a) creating a hole in the overwrap without breaching the integrity of the package;
   (b) introducing super-atmospheric air pressure between the overwrap and the package through the hole; and
   (c) determining whether the rate of air leakage from the overwrap is within acceptable limits.

10. The method of claim 9 wherein the hole is created by burning.

11. The method of claim 10 further comprising the step of applying suction to the overwrap to hold the package while said super-atmospheric air pressure is introduced between the overwrap and package.

12. The method of claim 11 wherein the suction is applied to the overwrap in an area completely surrounding the hole.

13. The method of claim 12 wherein step (c) is achieved by a transducer which measures back pressure from the package overwrap.

14. The method of claim 9 further comprising the step of applying suction to the overwrap to hold the package while super-atmospheric air pressure is introduced between the overwrap and the package.

15. The method of claim 14 wherein the suction is applied to the overwrap in an area completely surrounding the hole.

16. The method of claim 4 wherein step (c) is achieved by a transducer which measures back pressure.

17. An apparatus for testing the quality of a seal on a package overwrap comprising:
   (a) burning means for creating a hole in the overwrap without breaching the integrity of the package;
   (b) a measuring head comprising suction means for applying suction to the overwrap and air pressure means introducing super-atmospheric air pressure between the overwrap and the package through the hole; and
   (c) means for determining whether the rate of air leakage from the overwrap is within acceptable limits.

18. The apparatus of claim 17 wherein the measuring head further comprises a body having a substantially flat testing face for contacting the package overwrap, said testing face having outer and inner cavities arranged concentrically and defined by inner and outer lips, the outer cavity having a first aperture or apertures communicating said suction to the overwrap and the inner cavity having a second aperture communicating said super-atmospheric air pressure between the overwrap and package.

19. The apparatus of claim 18 wherein the areas of the testing face contacting the overwrap including the inner and outer lips are metalized.

20. The apparatus of claim 18 wherein the means for determining the acceptability of the rate of air leakage is a transducer which measures back pressure.

* * * * *